US012790779B2

(12) United States Patent
Sugitate et al.

(10) Patent No.: US 12,790,779 B2
(45) Date of Patent: Nov. 10, 2026

(54) SNOW BLOWER WITH BATTERY HOUSING

(71) Applicant: HONDA MOTOR CO., LTD., Tokyo (JP)

(72) Inventors: Kenta Sugitate, Saitama (JP); Takuya Odaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 935 days.

(21) Appl. No.: 18/147,053

(22) Filed: Dec. 28, 2022

(65) Prior Publication Data

US 2024/0218622 A1 Jul. 4, 2024

(51) Int. Cl.

*E01H 5/09* (2006.01)
*H01M 50/14* (2021.01)
*H01M 50/183* (2021.01)
*H01M 50/244* (2021.01)

(52) U.S. Cl.

CPC ............ *E01H 5/098* (2013.01); *H01M 50/14* (2021.01); *H01M 50/183* (2021.01); *H01M 50/244* (2021.01)

(58) Field of Classification Search

CPC ............................. E01H 5/098; H01M 50/183
See application file for complete search history.

(56) References Cited

U.S. PATENT DOCUMENTS

| | | | | |
|---|---|---|---|---|
| 7,963,344 | B2 * | 6/2011 | Marcil | A01B 33/028 172/43 |
| 8,653,786 | B2 * | 2/2014 | Baetica | H01M 50/262 56/11.9 |
| 2012/0317950 | A1 * | 12/2012 | Abe | A01D 34/81 56/11.9 |
| 2015/0033592 | A1 | 2/2015 | Kanbara et al. | |
| 2015/0240774 | A1 * | 8/2015 | Zeiler | H02J 7/0016 37/259 |
| 2016/0068224 | A1 * | 3/2016 | Rasmussen | B60L 1/003 429/83 |
| 2016/0108593 | A1 * | 4/2016 | Cohen | B60K 28/00 29/592.1 |
| 2017/0152638 | A1 * | 6/2017 | Fu | E01H 5/098 |
| 2018/0151854 | A1 * | 5/2018 | Kubota | A01D 34/81 |
| 2020/0203687 | A1 * | 6/2020 | Kim | H01M 10/625 |
| 2020/0325644 | A1 * | 10/2020 | Landry | E01H 5/04 |

FOREIGN PATENT DOCUMENTS

| | | | |
|---|---|---|---|
| JP | 2003268738 | A | 9/2003 |
| JP | 2015031061 | A | 2/2015 |
| WO | 2019186822 | A1 | 10/2019 |

* cited by examiner

*Primary Examiner* — Christopher J Sebesta
*Assistant Examiner* — Audrey L Lusk
(74) *Attorney, Agent, or Firm* — Armstrong Teasdale LLP

(57) ABSTRACT

A snow blower comprising, a snow blower main body (2), a travel unit (20), a work unit (30), an electric motor (26, 31) configured to drive the work unit and the travel unit, and a battery housing (80) including a recess (88) defined on an upper face of the snow blower main body for removably installing a battery therein, wherein the battery housing is configured to expose at least a part of an upper surface of the battery.

5 Claims, 9 Drawing Sheets

SNOW BLOWER WITH BATTERY HOUSING

TECHNICAL FIELD

The present invention relates to a snow blower, and more particularly to a snow blower provided with an electric motor for driving a work unit and/or a travel unit and a battery housing.

BACKGROUND ART

A snow blower generally has a work unit fitted with an auger, and removes snow by rotating the auger with the power of a prime mover transmitted by a belt transmission mechanism (See JP2015-31061A and WO2019/186822A, for example). In recent years, due to the increasing environmental awareness, the electric motor is being preferred as the prime mover, and this necessitates a battery to be mounted on the snow blower to provide electric power to the electric motor (See JP2003-268738A, for example).

A conventional snow blower equipped with such a battery is necessarily provided with a battery housing defining an enclosed space therein to protect the battery from snow and the like. However, since the housing space is closed to the outside, the heat generated from the battery during use is trapped in the housing space. The heat trapped in the housing space acts on the battery as a heat load, and may adversely affect the battery.

SUMMARY OF THE INVENTION

In view of such a problem of the prior art, a primary object of the present invention is to provide a snow blower that minimizes the load on the battery due to the heat generated from the battery, and improve the durability of the battery, thus contributing to the efficiency of energy.

To achieve such an object, the present invention provides a snow blower comprising a snow blower main body (2), a travel unit (20) supporting the snow blower main body so as to cause the snow blower main body to travel, a work unit (30) provided on the snow blower main body, an electric motor (26, 31) configured to drive the work unit and/or the travel unit, and a battery housing (80) including a recess (88) defined on an upper face of the snow blower main body for removably installing a battery therein, wherein the battery housing is configured to expose at least a part of an upper surface of the battery.

Thereby, the heat generated from the battery is removed from the exposed part of the battery so the heat load acting on the battery is minimized, and the durability of the battery durability is improved and, by extension, contribute to energy efficiency.

Preferably, the battery housing includes a bottom wall (82) inclining upward in a rearward direction to define a recess that receives the battery in a rear end up inclined posture so as to allow the battery to be put into and taken out of the recess in a rear end up inclined direction, a pair of sidewalls (84, 86) extending upward from either side the bottom wall, and a top wall (92) extending between the side walls to cover a front part of the recess from above, so that a rear upper part of the recess and a rear end of the recess is exposed in a continuous manner.

According to this aspect, the battery is exposed to the outside via the upper rear part and the rear end of the recess of the battery housing so that heat can be efficiently dissipated from the battery.

Preferably, the battery housing is configured such that the battery is put into and taken out of the recess in a fore and aft direction of the snow blower main body.

Thereby, installing and removing the battery can be facilitated.

Preferably, the work unit includes a rotary shaft (35) extending laterally of the snow blower main body, a spiral auger claw (36) attached to the rotary shaft, and a plurality of stay members (37) extending radially from the rotary shaft to connect the auger claw to the rotary shaft, wherein the battery housing is positioned so as to laterally align with at least one of the stay members.

Typically, the part of the auger claw adjacent to the stay member has a higher capability to scrape the snow than other parts of the claw remote from the part connected to the stay member. Therefore, the snow scraped by the part of the claw adjacent to the stay member tends to be finely broken up and whirled up more than the snow which is scraped by parts of the claw remote from the stay member. The finely broken up snow is likely to adhere to the exposed part of the battery, and this promotes the cooling of the battery.

Preferably, a rear edge part of the top wall of the battery housing is provided with a seal member (94) extending across a direction in which the battery is put into and removed from the recess.

Thereby, the moisture that is produced by the snow deposited on the battery melts or the rainwater deposited on the battery is prevented from flowing into the front part of the interior of the battery housing from the exposed part of the battery.

Preferably, the seal member extends in an obliquely forward direction from a laterally middle part thereof.

Thereby, the moisture that may enter the battery housing is expelled in a laterally outer direction.

Preferably, the seal member extends linearly in an obliquely forward direction from one end of the seal member to another.

Thereby, the moisture that may enter the battery housing is expelled in a laterally outer direction.

Preferably, the battery housing is provided with a mesh member (93) provided on an upper rear part of the recess which is otherwise exposed.

Thereby, foreign matter is prevented from entering the battery housing, and the battery is protected from being hit by foreign matter such as gravel.

The present invention thus provides a snow blower that minimizes the load on the battery due to the heat generated from the battery, and improves the durability of the battery, thus contributing to the efficiency of energy.

BRIEF DESCRIPTION OF THE DRAWING(S)

DESCRIPTION OF THE PREFERRED EMBODIMENT(S)

First Embodiment

Figure 1:
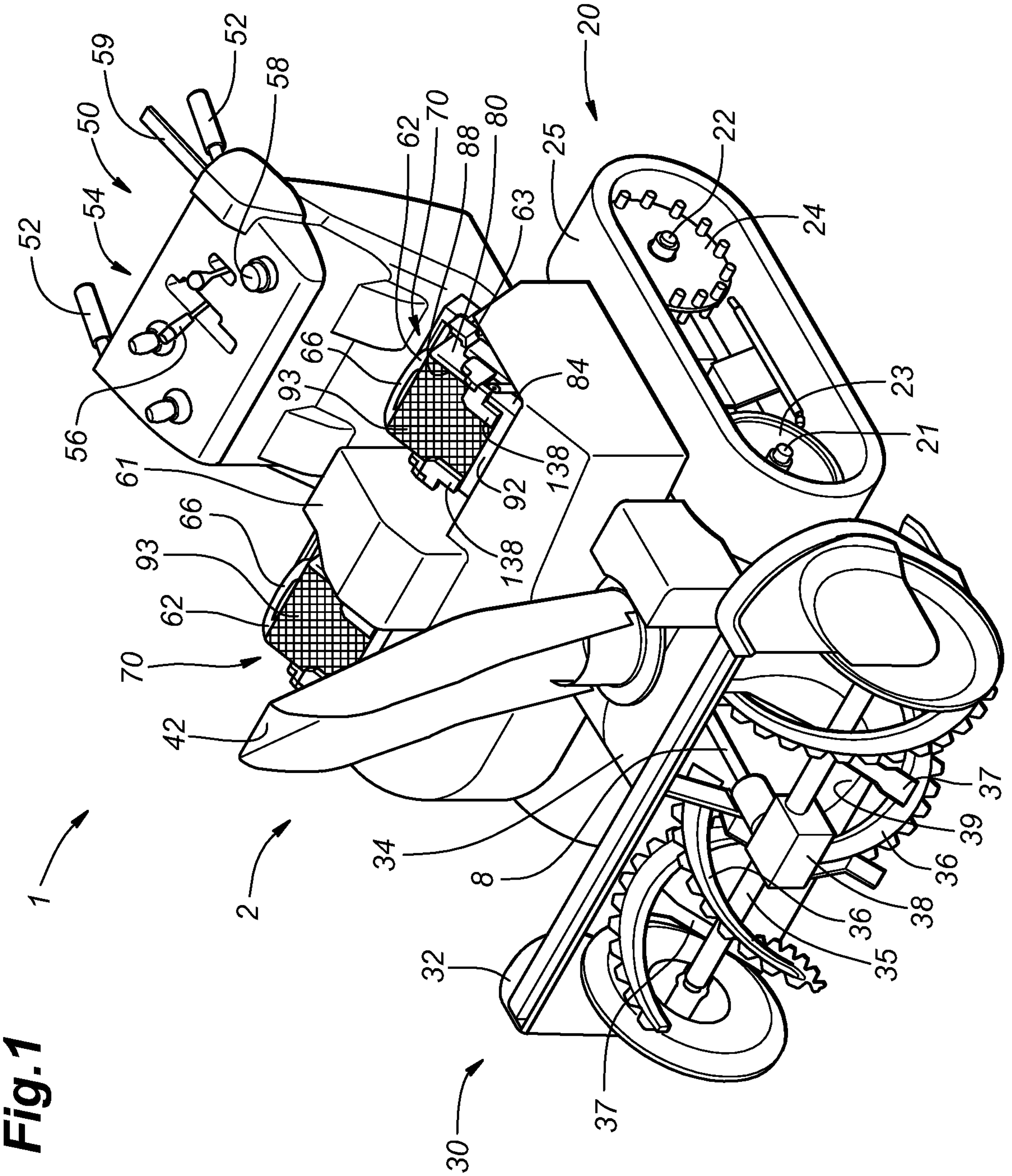
FIG. 1 is an overall perspective view of a snow blower according to the present invention.

Preferred embodiments of the present invention will be described in the following with reference to the appended drawings. As shown in FIG. 1, the snow blower 1 according to the present invention includes a snow blower main body 2, a travel unit 20 that supports the snow blower main body 2 so as to be able to travel, a work unit 30 for removing snow situated at the front end of the snow blower main body 2, and an operation unit 50 positioned at the rear end of the snow blower main body 2 to accept operation inputs for the travel unit 20 and the work unit 30.

Figure 2:
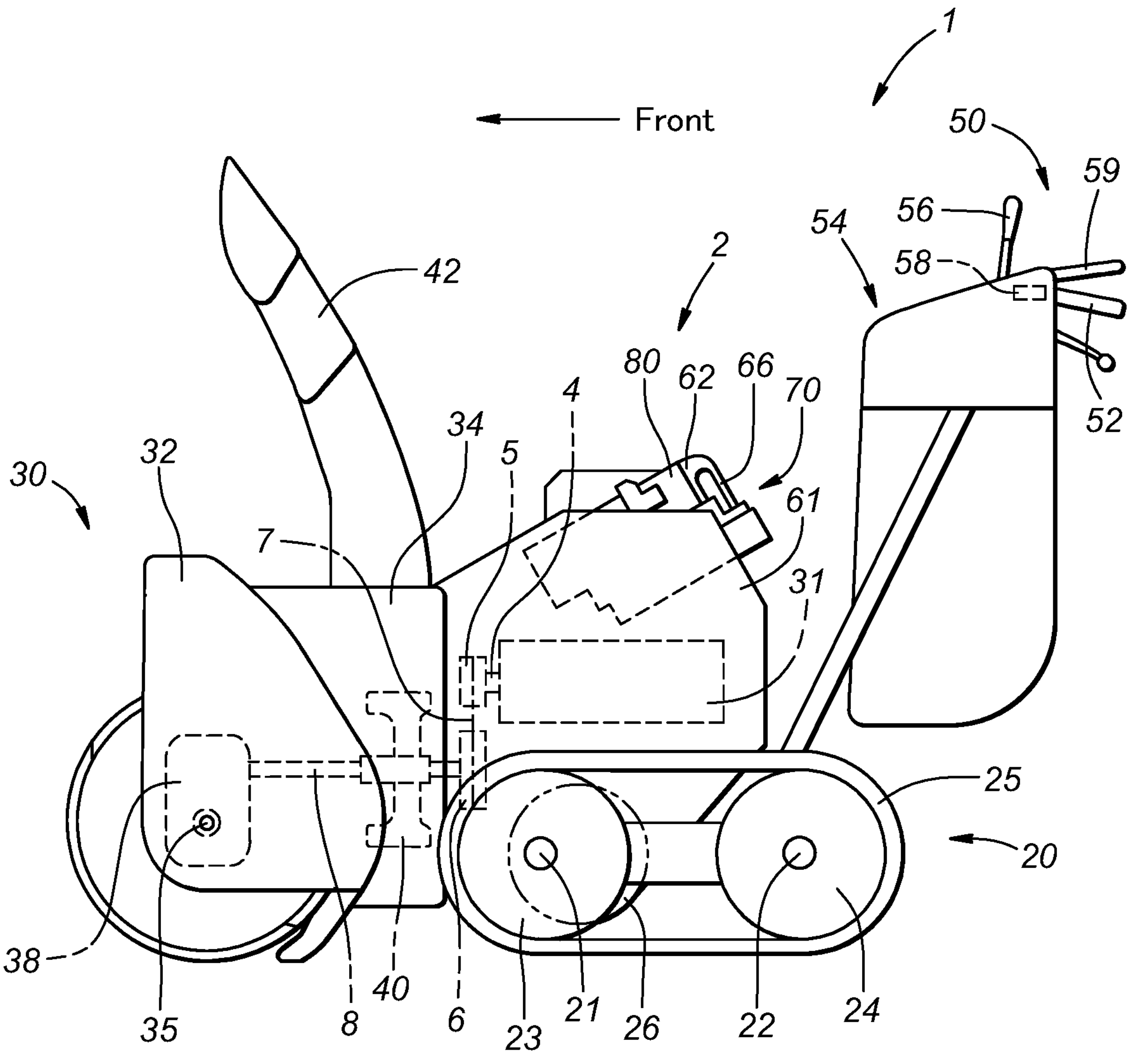
FIG. 2 is an overall side view of the snow blower.

As shown in FIG. 2 as well, the travel unit 20 is provided with a pair of driven wheels 23 fitted on either end of a front shaft 21, a pair of free wheels 24 fitted on either end of a rear shaft 22, and a pair of crawlers 25 each passed around the driven wheel 23 and the free wheel 24 on the corresponding side. The snow blower main body 2 is provided with a pair of travel motors 26 for driving the corresponding driven wheels 23 so that the left and right crawlers 25 can be individually driven.

Figure 3:
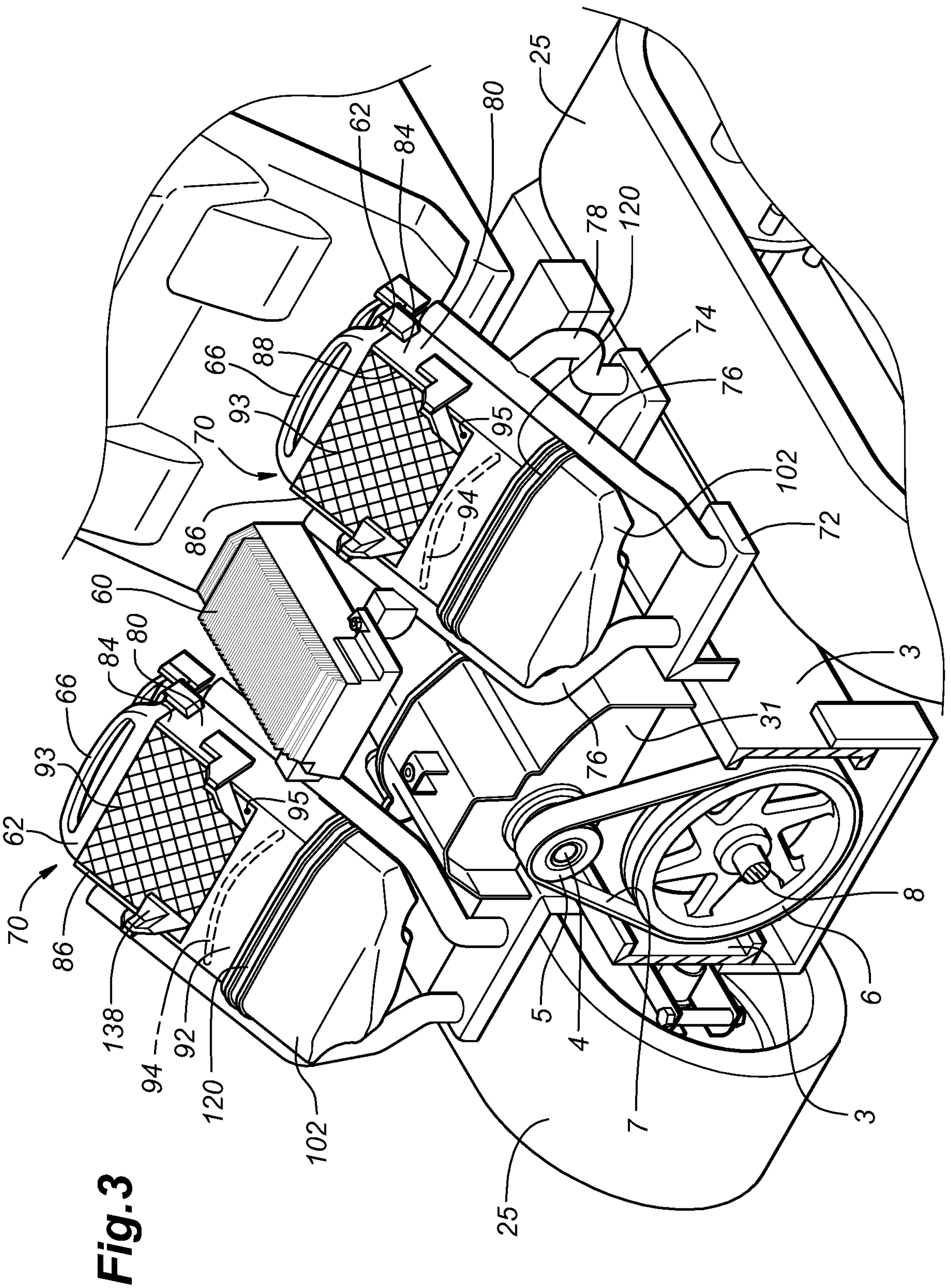
FIG. 3 is a perspective view of an essential part of the snow blower with a body cover removed.

As shown in FIG. 3, the snow blower main body 2 includes a pair of side members 3 consisting of channel members extending in the longitudinal direction on either side. As shown in FIGS. 2 and 3, the work motor 31 for driving the work unit 30 is mounted on a support member (not shown in the drawings) that extends between the side members 3 so as to be positioned slightly above the side members 3. The work motor 31 has an output shaft 4 projecting forward, and a drive pulley 5 is attached to the front end of the output shaft 4.

Below the output shaft 4 extends an input shaft 8 in the fore and aft direction in parallel with the output shaft 4. The input shaft 8 is rotatably supported by the side member 3, and a driven pulley 6 is fitted on the input shaft 8.

An endless transmission belt 7 is passed around the drive pulley 5 and the driven pulley 6. A tension roller (not shown in the drawings) for adjusting the tension of the transmission belt 7 is attached to the snow blower main body 2. In this manner, a belt transmission mechanism for transmitting the rotation of the work motor 31 from the output shaft 4 to the input shaft 8 is constructed. The belt for the belt transmission mechanism may be a flat belt, a V belt or a cogged belt.

As shown in FIGS. 1 and 2, the work unit 30 is provided with an auger case 32 which extends laterally at the front end of the snow blower 1 and is open at the front and the bottom thereof, and a blower case 34 connected centrally to the rear end of the auger case 32. A rotary shaft 35 extending laterally with respect to the snow blower main body 2 is rotatably supported by the left and right walls of the auger case 32. The rotary shaft 35 is provided with a spiral auger claw 36 that scrapes snow from either lateral side toward the center. The auger claw 36 includes a pair of band shaped claw members spirally arranged with a phase difference of 180 degrees around the rotary shaft 35, on each of the left and right sides. The laterally outer ends of each claw member are fixedly supported by the rotary shaft 35 via a disc shaped member fixed to the rotary shaft 35 on the outer side and an arm member radially extending from the rotary shaft 35 in the inner side, respectively. Each claw member is additionally supported by a metallic stay member 37 radially extending from the rotary shaft 35 at a position slightly displaced outward from the center of the claw member. A gear box 38 is provided in the middle part of the rotary shaft 35 so that the power input from the input shaft 8 is transmitted to the rotary shaft 35 via the gear box 38. The gear box 38 is internally provided with bevel gears (not shown in the drawings) or the likes, and transmits the rotational of the input shaft 8 to the rotary shaft 35.

The blower case 34 has a cylindrical shape having an axis extending in the fore and aft direction, and has a front end communicating with a substantially circular opening formed in the rear wall of the auger case 32, and a rear end which is closed. An intermediate part of the input shaft 8 passes through the interior of the blower case 34, and a blower 40 is attached to the intermediate part thereof. A cylindrical snow throwing duct 42 extends upward from an upper part of the blower case 34. As a result, the snow scraped from the left and right toward the center by the auger claw 36 is forwarded into the snow throwing duct 42 via the interior of the blower case 34, and thrown outward from the upper end of the snow throwing duct 42, under the action of the blower 40. The snow throwing duct 42 has a slightly curved and inclined shape, and is attached to the blower case 34 so as to be rotatable about the vertical axis. Therefore, by rotating the snow throwing duct 42, the operator can adjust the direction in which the snow is thrown.

The operation unit 50 includes a handle 52 and an input device 54. The handle 52 has a pair of grips fixed to the snow blower main body 2 so as to extend rearward from the lateral ends of the rear end of the snow blower main body 2. The input device 54 includes a travel lever 56 that accepts a travel mode selection operation of the snow blower 1, a snow removal switch 58 that accepts an activation command for the work unit 30, and a dead man's clutch lever 59 adjacent to one of the grip portions of the handle 52.

As shown in FIG. 3, a control unit 60 (electrical box) is positioned above the work motor 31 in a laterally middle part of the snow blower main body 2. The control unit 60 includes an electronic control unit consisting of a microcomputer and the like, and particularly includes a power control unit for controlling the travel motors 26 and the work motor 31.

A battery storage unit 70 is provided on each of the left and right sides of the control unit 60. Each battery storage unit 70 defines a recess 88 with an open rear end for removably receiving a battery 62 for powering the travel motors 26 and the work motor 31.

Each battery 62 has a substantially rectangular parallelepiped shape, and may be a rechargeable secondary battery. A battery-side connector 64 (see FIG. 6) for charging and supplying power is provided at a laterally central position of the front end of the battery 62, and a handle portion 66 for handling the battery 62 is provided at the rear end of thereof.

A body cover 61 that covers the travel motor 26, the belt transmission mechanism, and the control unit 60 is detachably provided on the snow blower main body 2. The body cover 61 is provided with a pair of openings 63 so as to expose the rear parts of the battery storage units 70 to the outside. As a result, the body cover 61 protects the travel motors 26, the belt transmission mechanism, and the control unit 60 from external elements such as rainwater and snow.

When the operator operates the travel lever 56 of the input device 54 to select the travel mode of the snow blower 1, the travel motor 26 performs the corresponding operation. The drive force of the travel motors 26 is transmitted to the driven wheels 23 via the front shaft 21 and a transmission mechanism (not shown in the drawings). As a result, the crawlers 25 turn and the snow blower 1 travels.

Also, when the operator operates the snow removal switch 58 of the input device 54 to operate the work unit 30, the work motor 31 rotates. The drive force of the work motor 31 is transmitted to the input shaft 8 via the belt transmission mechanism. The drive force of the input shaft 8 rotates the blower 40 and is transmitted to the rotary shaft 35 via the gear box 38, so that the rotary shaft 35 and the auger claw 36 are integrally rotated. When the auger claw 36 rotates, the snow in front of the snow blower 1 is crushed by the auger claw 36 and collected toward the laterally central part of the auger case 32. The collected snow is introduced into the blower case 34 and projected by the blower 40 through the snow throwing duct 42 in the direction of inclination of the snow throwing duct 42.

The parts of the auger claw 36 to which the stay members 37 are connected have a higher rigidity than other parts of the auger claw 36. Therefore, the parts of the auger claw 36 to which the stay members 37 are connected have a higher ability to crush snow so that the snow crushed by these parts of the auger claw 36 tends to be crushed into finer particles as compared to the snow crushed by other parts of the auger claw 36 to which the stay members 37 are not connected. The fine snow thus created tends to be more readily thrown rearward past the upper part of the auger case 32 and the blower case 34, instead of being captured in the auger case 32, and adhere to the snow blower main body 2.

The battery storage units 70 will be described in the following with reference to FIG. 3. The battery storage units 70 are positioned on either side of the control unit 60, and have an identical structure. Therefore, for the convenience of description, only one of them will be discussed in the following to avoid redundancy.

To each side member 3 are affixed a front bracket 72 and a rear bracket 74 projecting substantially horizontally outward one behind the other with a certain spacing therebetween. A pair of side pipes 76 are joined to the front bracket 72 in a laterally spaced apart relationship. Each side pipe 76 rises slightly vertically from the base end, is bent outward, and then extends rearward with an upward inclination toward the rear. An outwardly curved reinforcing pipe 78 is connected between a rear end part of each side pipe 76 and the corresponding part of the rear bracket 74.

The battery storage unit 70 includes a battery housing 80 having a substantially rectangular parallelepiped shape elongated in the fore and aft direction and supported by the two side pipes 76 on the corresponding side. The recess 88 for receiving the battery 62 is defined inside the battery housing 80. The battery housing 80 is attached to the corresponding side pipes 76 by suitable fittings (not shown in the drawing). As a result, the battery housing 80 is mounted with an upward inclination toward the rear.

The battery 62 can be received in the recess 88 by inserting the front end of the battery 62 forward from the open rear end of the recess 88. The direction in which the battery 62 is put into and taken out coincides with the fore and aft direction of the snow blower main body 2 in top view, and the battery housing 80 is disposed so as to be inclined upward toward the rear while the battery 62 is also mounted with an upward inclination toward the rear.

The operator will stand behind the snow blower 1 for operating the snow blower 1. Therefore, the operator can put into and take out the two batteries 62 without moving much from this position so that the work efficiency is improved.

Figure 4:
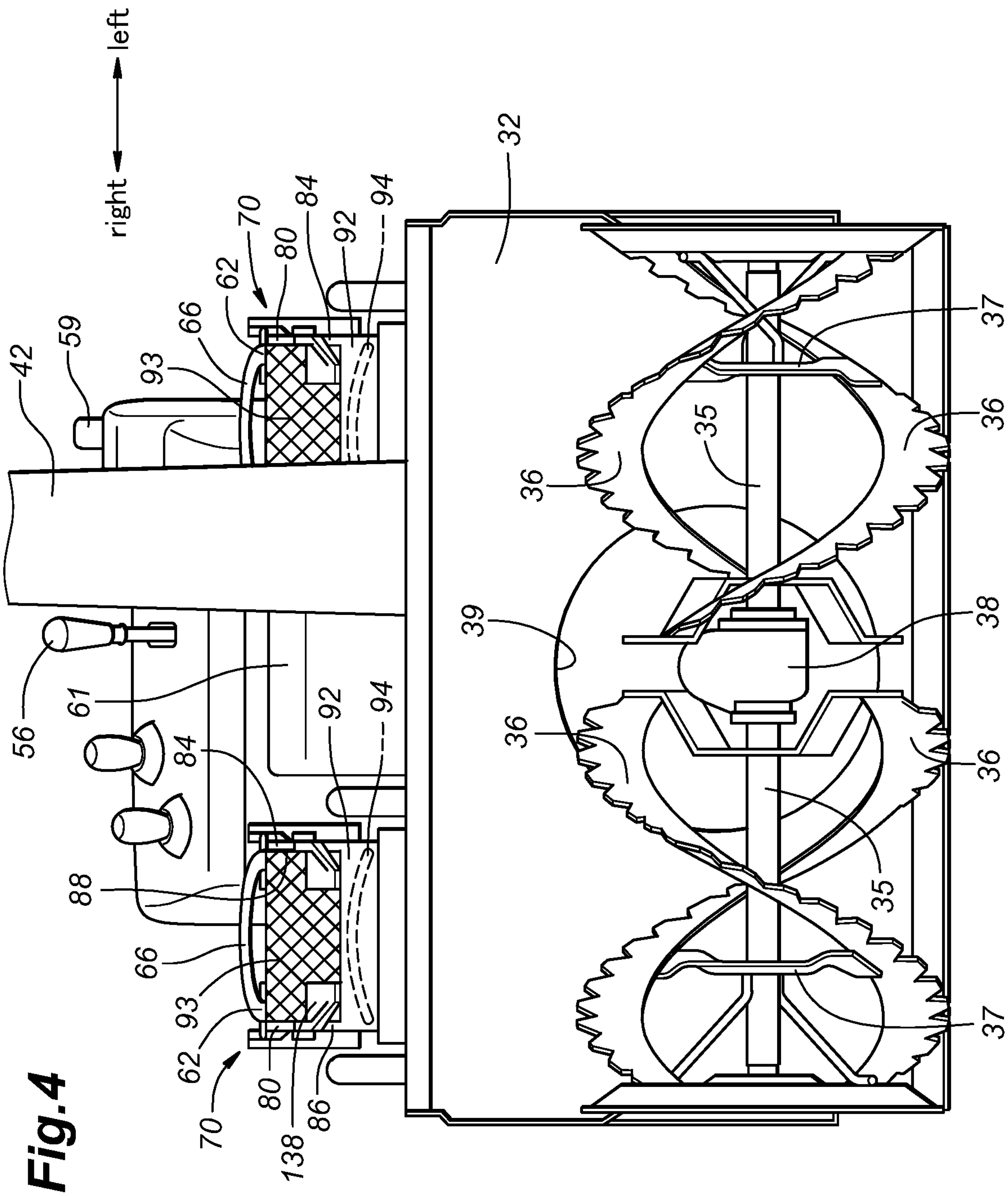
FIG. 4 is a front view of the snow blower.

As shown in FIG. 4, on each side of the snow blower 1, the battery housing 80 and the battery 62 are arranged at positions aligned with the stay member 37 with respect to the lateral direction. In other words, in front view, the left battery 62 and the left battery housing 80 align with the stay member 37 on the left side, and the right battery 62 and the right battery housing 80 align with the stay member 37 on the right side.

Figure 5:
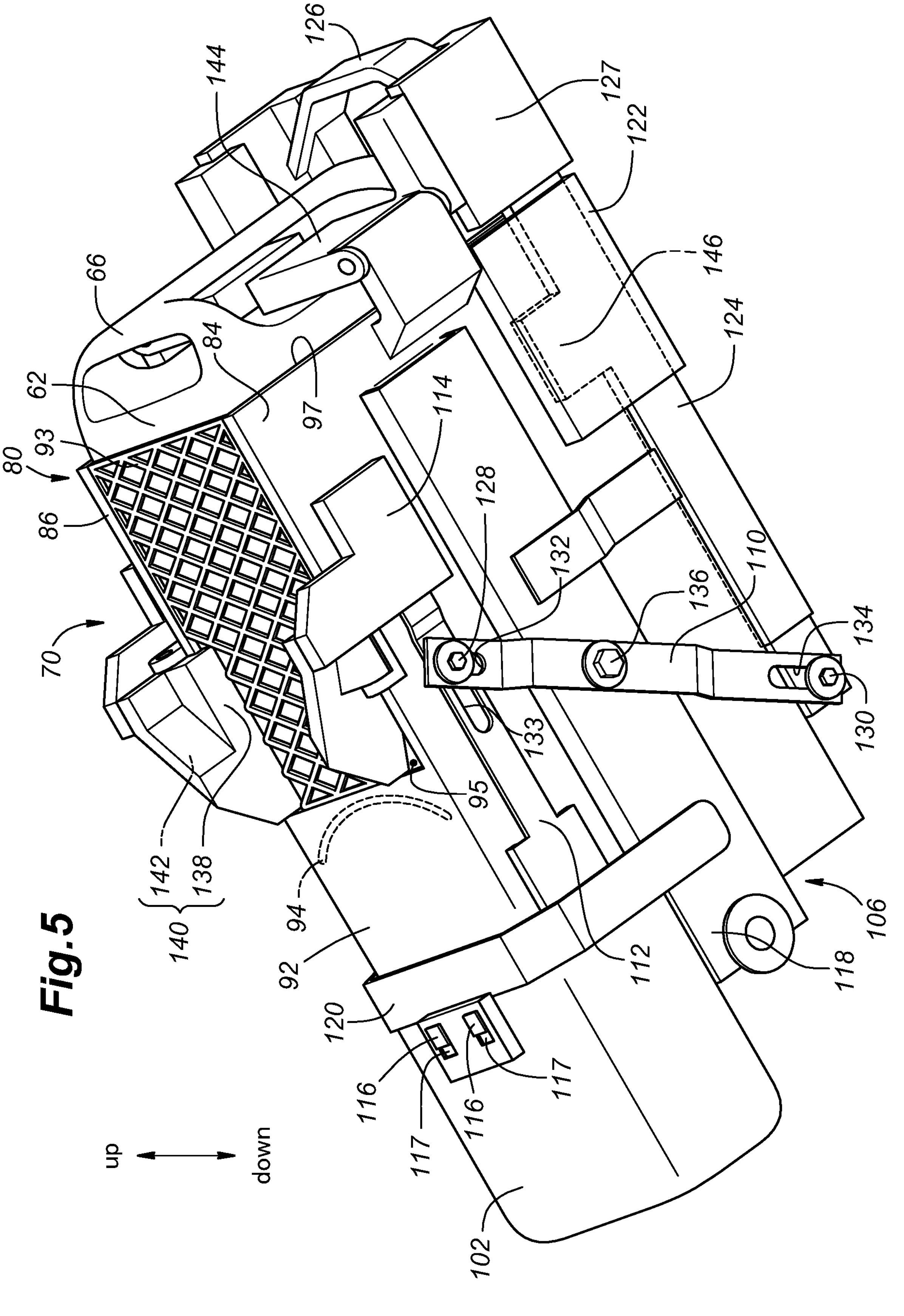
FIG. 5 is a perspective view of a battery housing and a battery according to a first embodiment of the present invention.

As shown in FIG. 5, the battery housing 80 is made of resin material, and has a box shape. In the following description, although the batteries 62, as well as the battery housings 80, are mounted on the snow blower main body 2 with an upward inclination toward the rear, for the convenience of explanation, the direction orthogonal to the upper surface of the battery 62 may be referred to as the upward direction, and the extending direction of the battery 62 may be referred to as the fore and aft direction. The battery housing 80 has a bottom wall 82 with an upward inclination toward the rear with respect to the horizontal plane, and a left side wall 84 and a right side wall 86 standing upright on either side of the bottom wall 82 to define the recess 88. Further, the battery housing 80 includes a top wall 92 extending between the upper edges of the left side wall 84 and the right side wall 86 so as to cover the front part of the recess 88 from above, and a front wall 90 extending to a height which is short of the top wall 92 by a prescribed distance and connecting the front edges of the left side wall 84 and the right side wall 86 to each other. Therefore, between the upper edge of the front wall 90 and the top wall 92, a laterally elongated rectangular insertion opening 100 is defined.

The rear part of the recess 88 is covered from above with a mesh member 93. The mesh member 93 is connected between the rear edge of the top wall 92, the top edge of the left side wall 84 and the top edge of the right side wall 86. Thus, the upper rear part of the recess 88 and the rear end of the recess 88 are continuously and substantially open to the outside. The rear end of the recess 88 forms a loading/unloading opening 97 for the battery 62. A substantially rectangular cutout 95 is provided on each side of a front part of the mesh member 93.

The space in the battery housing 80 for accommodating the battery 62 is slightly larger than the outer size of the battery 62 so that a gap is created between the top wall 92, the left side wall 84 and the right side wall 86 and the corresponding surfaces of the battery 62.

Hereinafter, the direction in which the battery 62 is put into and taken out of the rearward and upward direction may be simply referred to as the fore and aft direction.

When the battery 62 is received in the battery housing 80, the upper surface of the battery 62 is exposed upward from the rear part of the recess 88 of the battery housing 80. Also, the rear end of the battery 62 including the handle portion 66 is exposed from the loading/unloading opening 97 of the battery housing 80.

The heat generated from the battery 62 as the battery 62 supplies electric power to the travel motors 26 and the work motor 31 is emitted to the outside from the upper surface and the rear end of the battery 62 which is exposed from the battery housing 80 so that the heat load acting on the battery 62 is minimized. This improves the durability of the battery 62 and, by extension, contributes to energy efficiency. By opening not only the rear end of the recess 88 but also the upper rear part of the recess 88, the exposed part of the battery 62 can be increased so that efficient heat dissipation can be accomplished. Since the temperature of the environment in which the snow blower 1 is employed can be assumed to be low, a high rate of heat dissipation can be expected from the surrounding air.

The fine snow created by the parts of the auger claw 36 where the above-described stay members 37 are connected has a high tendency to pass through the mesh member 93 and adhere to the exposed upper surface of the battery 62. This provides a favorable circumstance for cooling the battery 62. The mesh member 93 prevents foreign objects such as pebbles thrown up toward the batteries 62 by the auger claw 36 from contacting the batteries 62.

Figure 6:
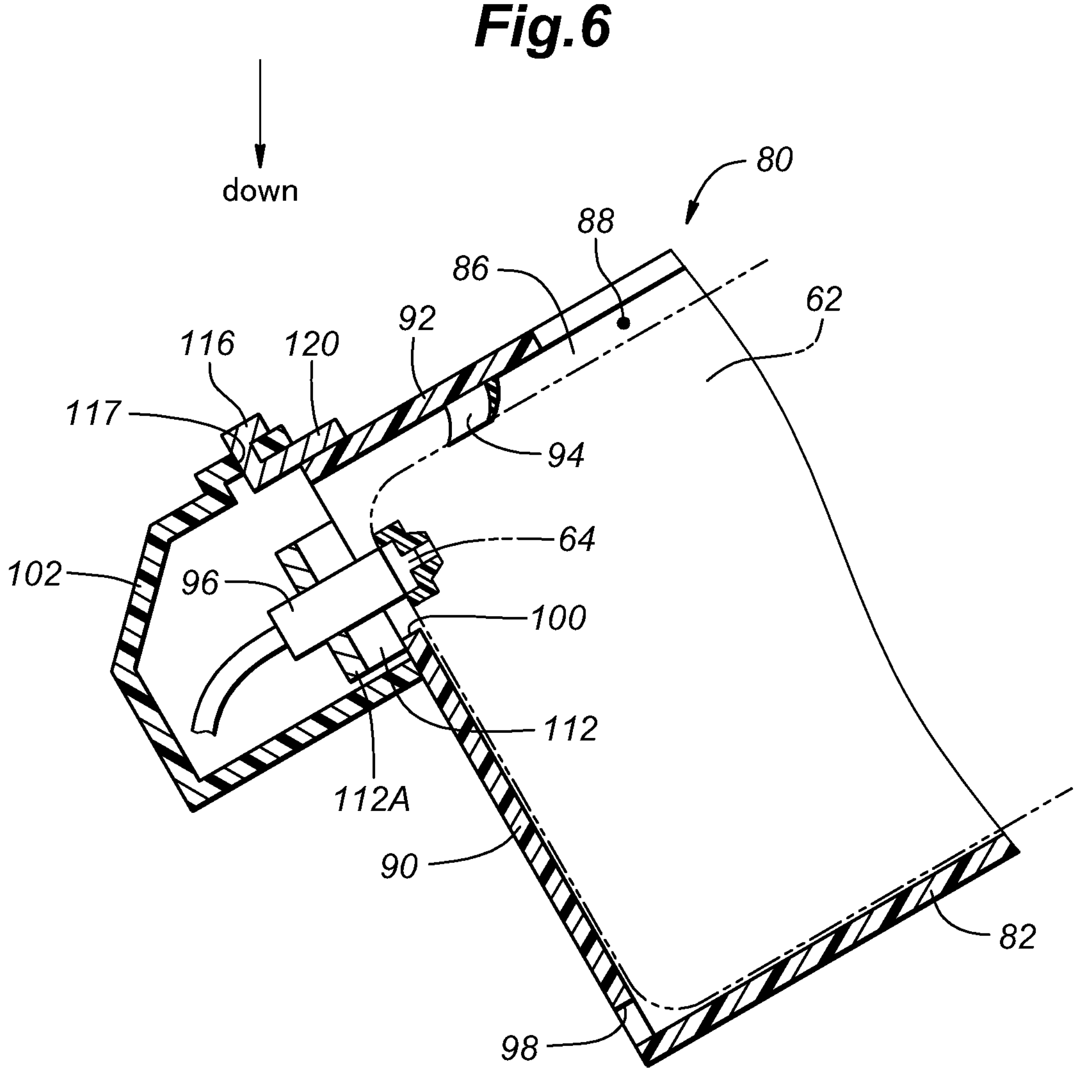
FIG. 6 is a fragmentary sectional side view of a front end part of the battery housing and the battery.

As shown in FIGS. 5 and 6, on the inner surface of the rear edge of the top wall 92 of the battery housing 80 is fitted with a seal member 94 in the form of a strip extending in a direction intersecting the insertion/removal direction, or in the lateral direction of the top wall 92. The two ends of the seal member 94 extend to the left and right side walls 84, 86, respectively, or to points slightly short of the left and right side walls 84, 86, respectively. The seal member 94 is inclined in a forward direction from the central part thereof to both outer sides. In the illustrated embodiment, the seal member 94 has a curved shape, but may also have a straight shape so as to form an inverted V shape. The width of the seal member 94, or, the vertical dimension as measured from the inner surface of the top wall 92 is set slightly longer than the width of the gap formed between the inner surface of the top wall 92 and the upper surface of the battery 62 so that when the battery 62 is inserted, the seal member 94 resiliently abuts against the upper surface of the battery. Furthermore, the lower end of the seal member 94 is preferably tapered so as to form a lip seal.

Thus, when the battery 62 is inserted into the battery housing 80, the lower end of the seal member 94 contacts the upper surface of the battery 62 and bends forward in the insertion/removal direction. When the battery 62 is received in the battery housing 80, the lower end of the seal member 94 is kept in contact with the upper surface of the battery 62 by the elastic biasing force.

The snow adhering to the exposed upper surface of the battery 62 is melted by the external air or the heat of the battery 62 and turns into water droplets. The water droplets then flow forward along the upper surface of the battery 62. The seal member 94 guides water droplets to the left and right sides along the upper surface of the battery 62 and prevents them from flowing into the laterally central part of the front end of the battery 62. Therefore, water is prevented from reaching the terminals of the battery-side connector 64 of the battery 62 provided at the laterally central part of the front end of the battery 62 or the terminals of the case-side connector 96 which will be described later, and owing to the rear-facing convex shape of the seal member 94, water droplets are prevented from being accumulated behind the seal member 94. A drain port 98 for discharging water which may accumulate inside the battery housing 80 may be provided at the lower edge of the front wall 90 or the front edge of the bottom wall 82.

The battery storage unit 70 is provided with a structure for electrically connecting and disconnecting the battery 62 to and from the electric circuit on the side of the snow blower main body 2 in synchronism with the operation of inserting and removing the battery 62. This structure will be described in detail below.

As shown in FIGS. 5 and 6, to the outer side surface of the battery housing 80 is fixedly secured a support frame 106 which includes a pair of plate-like side frames 118 fixed to the battery housing 80 so as to extend in the fore and aft direction along either side surface of the battery housing 80. A plate-like front frame 120 is connected between front end parts of the side frames 118 so as to straddle the front end part of the battery housing 80 from above. A connector cover 102 is attached to a front end part of the battery housing 80 to protect the case-side connector 96 from external influences. A pair of claws 116 extending forward from a central part of the front frame 120, and these claws 116 engage with engagement holes 117 provided in the connector cover 102 to fixedly secure the connector cover 102 to the front end of the battery housing 80.

A pair of upper side plates 112 extend parallel to the side frames 118 along parts of the outer side surfaces of the battery housing 80 positioned above the support frames 106, and are each supported by a guide mechanism (not shown in the drawings) so as to be slidable in the fore and aft direction. Between the front ends of the upper side plates 112 extends a cross plate 112A which passes through a gap (not shown in the drawings) defined between the connector cover 102 and the front end of the battery housing 80. The case-side connector 96 is attached to a central part of the cross plate 112A so as to oppose the insertion opening 100. The case-side connector 96 is electrically connected to the electric circuitry on the side of the snow blower main body 2. The upper side plates 112 and the cross plate 112A are integrally formed of a metal plate strip. The rear ends of the upper side plates 112 are each fixedly provided with a first drive member 114 which is made of resin material.

Further, a pair of lower side plates 124 extend parallel to the side frames 118 along parts of the outer side surfaces of the battery housing 80 positioned below the side frames 118, and are guided by respective slide guides 122 provided on the corresponding side surfaces of the battery housing 80 so as to be slidable in the fore and aft direction. A plate-like grip portion 126 extends laterally between the rear ends of the lower side plates 124. The lower side plates 124 and the grip portion 126 are made of a single metal plate member. A relatively soft resin material is wrapped around the grip portion 126. A second drive member 127 made of resin material is attached to the rear end of each lower side plate 124.

A middle point of each side frame 118 along the fore and aft direction is pivotally connected to a middle point of a seesaw plate 110 consisting of an elongated plate member via a pivot pin 136. Each seesaw plate 110 is tilted backward with respect to the fore and aft direction, and is provided with an slot 132 extending in the lengthwise direction at the upper end thereof. A slot 133 extending in the lengthwise direction is provided in a middle part of the corresponding upper side plate 112, and a slide pin 128 is received in these slots 132,133. The bottom end of the seesaw plate 110 is provided with a slot 134 extending in the lengthwise direction thereof, and the slot 134 receives a slide pin 130 provided fixedly on the corresponding lower side plate 124.

A first holding member 140 is provided at the upper end of each side wall 84 and 86 adjacent to the corresponding cutout 95 provided in the mesh member 93 so as to be rotatable about an axis extending in the fore and aft direction. The first holding member 140 is provided with a holding portion 138 capable of contacting the upper surface of the battery 62 via the cutout 95 and a cam portion 142 configured to cooperate with the first drive member 114 of the corresponding upper side plate 112. The first holding member 140 is normally biased by a spring (not shown in the drawings) so that the holding portion 138 thereof is displaced toward a release position away from the upper surface of the battery 62. When the first drive member 114 is in the advanced position, the holding portion 138 occupies the release position under the spring force, but when the first drive member 114 is in the receded position, the first drive member 114 and the cam portion 142 are engaged with the result that the holding portion 138 occupies a holding position in which the holding portion 138 abuts on the upper surface of the battery 62 via the cutout 95 provided in the mesh member 93.

Figure 7:
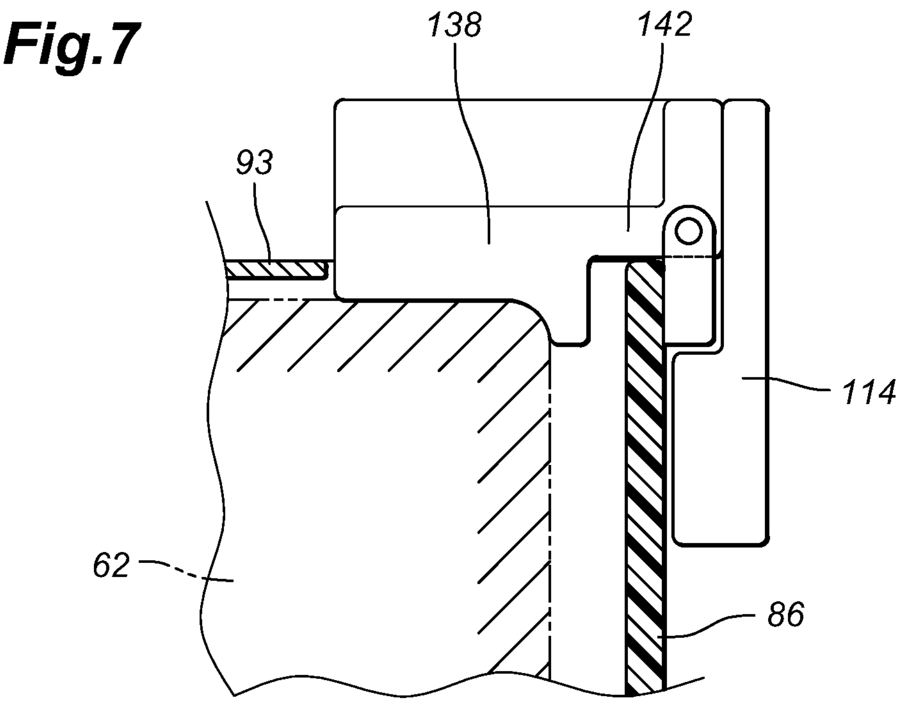
FIG. 7 is a fragmentary sectional rear view of a battery retaining structure.

Ridges on both sides of the upper surface of the battery 62 are rounded. As shown in FIG. 7, since each holding portion 138 has an inclined surface that abuts on the corresponding ridge, an inward pressing force is generated when the holding portions 138 abut on the upper surface of the battery 62. Therefore, when the holding portions 138 contact the upper surface of the battery 62, the battery 62 is centered with respect to the lateral direction.

A second holding member 144 is provided at the rear edge of each side wall 84 and 86 so as to be rotatable about a vertical axis. The second holding member 144 is provided so as to be able to come into contact with the rear surface of the battery 62. The second holding member 144 is normally urged by a spring (not shown in the drawings) toward a holding position where the second holding member 144 contacts the rear surface of the battery 62. Each lower side plate 124 is provided with an engaging portion 146 capable of selectively coming into contact with the surface of the second holding member 144 facing the battery 62. When the lower side plate 124 is in the advanced position as shown in FIG. 5, the engaging portion 146 is released from the second holding member 144 (the engaging portion 146 lightly abutting or slightly separated from the second holding member 144), and the second holding member 144 occupies the holding position where the rear surface of the battery 62 is held by the second holding member 144 under the biasing force of the spring. When the lower side plate 124 recedes from the advanced position, the engaging portion 146 retreats together with the lower side plate 124, thereby rotating the second holding member 144 outward against the biasing force of the spring with the result that the second holding member 144 occupies the released position away from the rear surface of the battery 62. Thereby, the battery 62 can be pulled out rearward without being restrained and removed from the battery housing 80.

Next, the operating procedure of the battery storage unit 70 when the battery 62 is put into and taken out of the battery housing 80 will be described in the following.

In order to insert the battery 62 into the battery housing 80, it is necessary to pull the first the grip portion 126 sufficiently rearward. In this state, the holding portion 138 of the first holding member 140 is flipped upward under the spring force, and the second holding member 144 is flipped backward by the engaging portion 146 against the biasing force. Therefore, there is nothing to prevent the battery 62 from being inserted into the battery housing 80. Therefore, the user grips the handle portion 66 of the battery 62 and pushes the battery 62 into the battery housing 80 from the rear end of the battery housing 80 until the front end of the battery 62 hits the front wall 90. Since the battery housing 80 has inner dimensions slightly larger than the outer dimensions of the battery 62, the battery 62 can be pushed in substantially without any resistance. In addition, since the bottom wall 82 is slanted forward and downward, the battery 62 can be pushed in with a relatively little effort due to the action of gravity. Even when the tip of the battery 62 hits the front wall 90, the case-side connector 96 is slightly separated from the battery-side connector 64.

Next, the user pushes the lower side plate 124 forward by gripping the grip portion 126. In the initial state of the forward movement, each slide pin 128 moves along the slot 133 provided in the corresponding upper side plate 112, so that the upper side plate 112 remains stationary and only the lower side plate 124 advances. As a result, the second holding member 144 is pressed against the rear end of the battery 62 under the spring force. Once the slide pin 128 reaches the rear end of the slot 133 and further pushes the grip portion 126 forward, the upper side plate 112 begins to move rearward. As a result, on the one hand, the interaction between the first drive members 114 of the upper side plates 112 and the cam portions 142 causes the holding portions 138 of the first holding members 140 to push the upper part of the battery 62 from either side against the spring force with the result that the battery 62 is centered with respect to the lateral direction, and is restrained in this position. Since the holding portions 138 restrain the battery 62 with the pushing force applied to the grip portion 126 by the user which is transmitted via the cam portions 142, a high restraining force can be obtained. On the other hand, the case-side connector 96 provided on the cross plate 112A also moves rearward, and eventually causes the case-side connector 96 to be fully connected to the battery-side connector 64.

In this way, when the grip portion 126 is fully pushed in, the battery 62 is held in a properly positioned state with respect to the fore and aft direction and the lateral direction, and the connection between the case-side connector 96 and the battery-side connector 64 is fully established.

In order to remove the battery 62 from the battery housing 80, it is necessary to first pull out the grip portion 126 rearward. When the lower side plates 124 are moved rearward together with the grip portion 126, the case-side connector 96 and the battery-side connector 64 are first pulled apart from each other, and the first drive members 114 and the cam portions 142 are separated from each other through the process reverse to that described above, and the holding portions 138 of the first holding members 140 are released from the upper surface of the battery 62 under the spring force. Subsequently, the second holding members 144 are released from the engaging portions 146 of the second drive members 127 on the side of the lower side plates 124 against the spring force. As a result, the battery 62 is released from the restraint of the first holding members 140 and the second holding members 144, and can be removed from the battery housing 80 without resistance.

The inner surface of the battery housing 80 is dimensioned so that there is a slight gap not only in the vertical direction but also in the lateral direction, but the battery housing 80 can be positioned accurately owing to the centering action of the holding portions 138 of the first holding members 140. Since the battery 62 is placed on the bottom wall 82, it is positioned accurately in the vertical direction as well. Therefore, when inserting the battery 62 into the battery housing 80, the battery-side connector 64 can be connected to the case-side connector 96 in an accurately aligned state. When pulling the battery 62 out of the battery housing 80, the battery-side connector 64 and the case-side connector 96 can be pulled out in the correct direction. Therefore, the terminals of the battery-side connector 64 and the case-side connector 96 are prevented from undue loading, and prevented from being damaged. Therefore, it is possible to eliminate the need for a floating connector structure, which is often used in such battery housing structures.

Second Embodiment

The battery storage unit 70 according to the second embodiment differs from the battery storage unit 70 of the first embodiment only in the shape of the seal member 94, and is otherwise similar to that of the first embodiment. In the following description, the parts corresponding to those of the first embodiment are denoted with like numerals without necessarily repeating the description of such parts to avoid redundancy.

Figure 8:
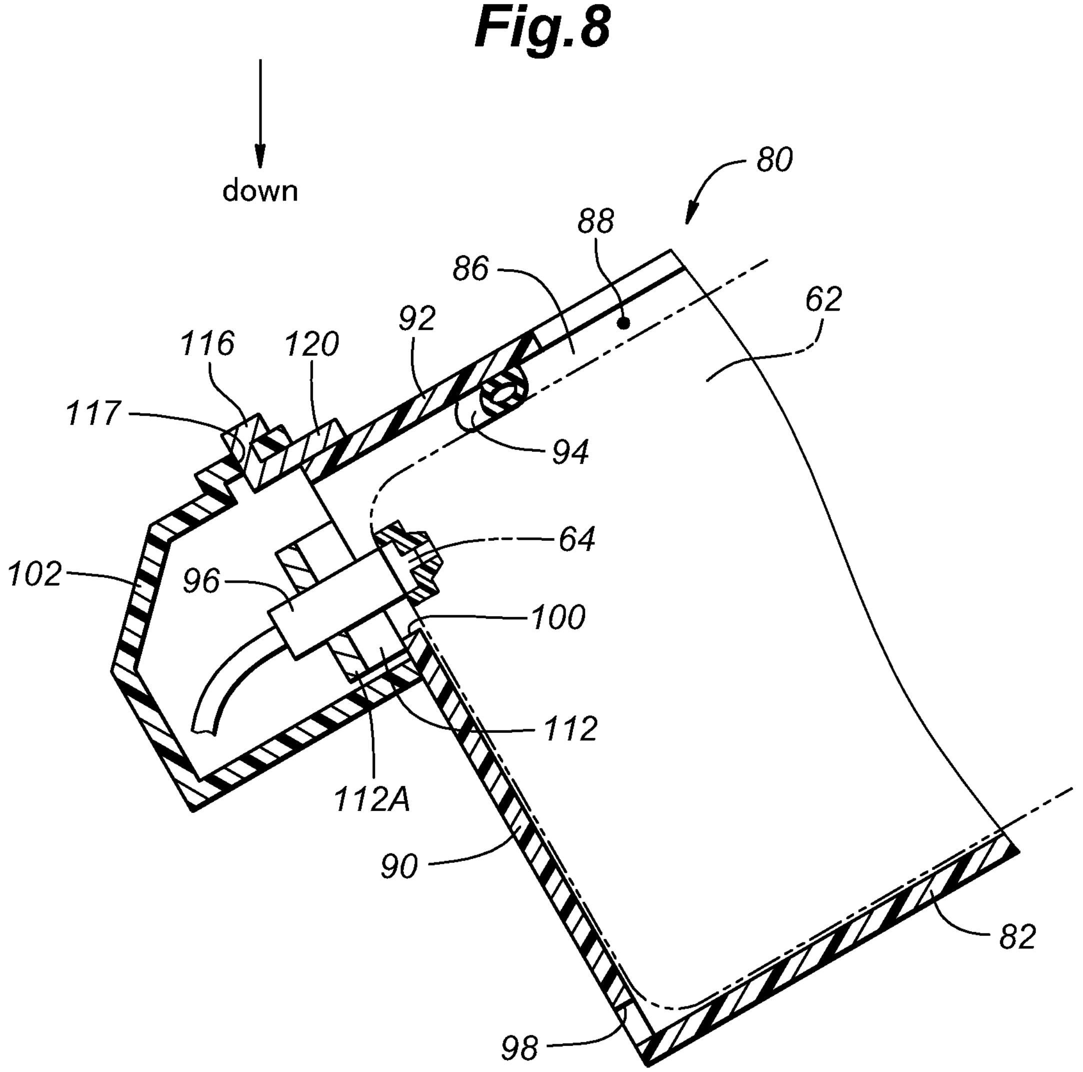
FIG. 8 is a fragmentary sectional side of a front end part of the battery housing according to a second embodiment of the present invention.

As shown in FIG. 8, the seal member 94 has a hollow interior, and has a rounded bottom end so as to define a D-shaped cross section. The width of the seal member 94, or the dimension from the inner surface of the top wall 92 to the tip of the seal member 94 is slightly longer than the width of the gap formed between the top wall 92 and the upper surface of the battery 62 in the free state so that when the battery 62 is inserted, the seal member 94 is caused to resiliently abut against its upper surface of the battery 62.

Thus, when the battery 62 is inserted into the battery housing 80, the lower end of the seal member 94 contacts the upper surface of the battery 62 and bends forward and upward with respect to the insertion/removal direction. The hollow interior of the seal member 94 allows the lower end part thereof to easily bend upward so that the seal member 94 is enabled to accommodate itself to the width of the gap formed between the top wall 92 and the upper surface of the battery 62. When the battery 62 is received in the battery housing 80, the upper surface of the battery 62 is kept in contact with the seal member 94 owing to the biasing force thereof. As a result, the seal member 94 guides the water droplets flowing forward along the upper surface of the battery 62 to either lateral side along the upper surface of the battery 62 and prevents the water droplets from flowing into the laterally central part of the front end of the battery 62.

Third Embodiment

The battery storage unit 70 according to the third embodiment differs from the battery storage unit 70 of the first embodiment only in the arrangement of the seal member 94, and is otherwise similar to that of the first embodiment. In the following description, the parts corresponding to those of the first embodiment are denoted with like numerals without necessarily repeating the description of such parts to avoid redundancy.

Figure 9:
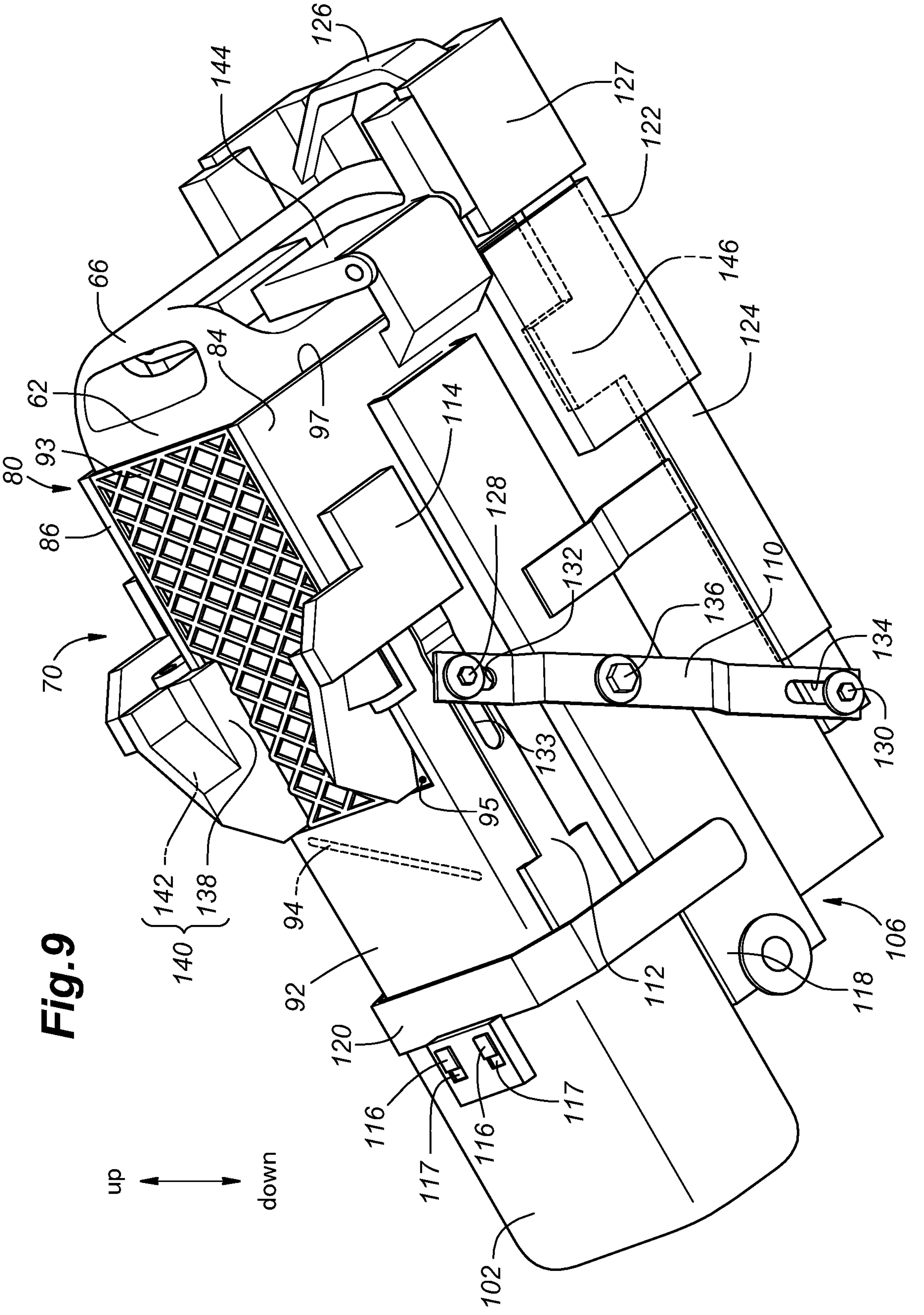
FIG. 9 is a perspective view of a battery housing and a battery according to a third embodiment of the present invention.

As shown in FIG. 9, the seal member 94 extends substantially linearly from the one side to the other of the top wall 92 while being inclined forward. Preferably, the seal member 94 inclines forward as one moves in the outboard direction. In other words, the seal member 94 for the right battery storage unit 70 may slant forward toward the right side (the outboard side) while the seal member 94 for the left battery storage unit 70 may slant forward toward the left side (the outboard side). Thereby, the water droplets flowing along the upper surface of the batteries 62 are guided to the outboard sides of the batteries 62 so that the water droplets are effectively prevented from coming close to electric components of the snow blower 1.

The present invention has been described in terms of specific embodiments, but the present invention is not limited by such embodiments and can be modified in various ways without departing from the scope of the present invention.

For instance, the mesh members 93 may be configured to be detachable by using hinges, fasteners or snap fit arrangements. It is also possible to omit the mesh members 93.

Further, each battery 62 may be exposed not only in the upper rear and rear parts thereof, but also in side parts thereof by forming cutouts in the side walls 84 and 86 or mesh parts therein.

Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. A snow blower comprising:

a snow blower main body;

a travel unit supporting the snow blower main body so as to cause the snow blower main body to travel;

a work unit provided on the snow blower main body;

an electric motor configured to drive the work unit and/or the travel unit; and a battery housing including a recess defined on an upper face of the snow blower main body for removably installing a battery therein, wherein the battery housing is configured to expose at least a part of an upper surface of the battery, wherein the battery housing includes a bottom wall inclining upward in a rearward direction to define the recess that receives the battery in a rear end up inclined posture so as to allow the battery to be put into and taken out of the recess in a rear end up inclined direction, a pair of sidewalls extending upward from either side the bottom wall, and a top wall extending between the side walls to cover a front part of the recess from above, so that a rear upper part of the recess and a rear end of the recess is exposed in a continuous manner, wherein the top wall covers a front part of the battery received in the recess from above, wherein the battery housing is configured such that the battery is put into and taken out of the recess in a fore and aft direction of the snow blower main body, wherein a rear edge part of the top wall of the battery housing is provided with a seal member extending across a direction in which the battery is put into and removed from the recess, and wherein the seal member has a lower end positioned to contact the upper surface of the battery and bend forward in the insertion/removal direction when the battery is inserted into the battery housing, and the lower end of the seal member is maintained in contact with the upper surface of the battery by an elastic biasing force when the battery is received in the battery housing.

2. The snow blower according to claim 1, wherein the work unit includes a rotary shaft extending laterally of the snow blower main body, a spiral auger claw attached to the rotary shaft, and a plurality of stay members extending radially from the rotary shaft to connect the auger claw to the rotary shaft, wherein the battery housing is so as to laterally align with at least one of the stay members.

3. The snow blower according to claim 1, wherein the seal member extends in an obliquely forward direction from a laterally middle part thereof.

4. The snow blower according to claim 1, wherein the seal member extends linearly in an obliquely forward direction from one end of the seal member to another.

5. The snow blower according to claim 1, wherein the battery housing is provided with a mesh member provided on an upper rear part of the recess which is otherwise exposed.

* * * * *